United States Patent

Feistel

(10) Patent No.: US 6,357,755 B1
(45) Date of Patent: Mar. 19, 2002

(54) SEALING ELEMENTS FOR DRY RUNNING PISTON COMPRESSORS

(75) Inventor: Norbert Feistel, Winterthur (CH)

(73) Assignee: Maschinenfabrik Sulzer-Burckhardt AG, Basel (CH)

( * ) Notice: Subject to any disclaimer, the term of this patent is extended or adjusted under 35 U.S.C. 154(b) by 0 days.

(21) Appl. No.: 09/240,972

(22) Filed: Jan. 29, 1999

(30) Foreign Application Priority Data

Feb. 2, 1998 (EP) .................................. 98810077

(51) Int. Cl.$^7$ .............................................. F01D 11/02
(52) U.S. Cl. .................... 277/434; 277/540; 277/945
(58) Field of Search ................... 277/434, 532, 277/535, 539, 540, 945, 938

(56) References Cited

U.S. PATENT DOCUMENTS

| | | | | |
|---|---|---|---|---|
| 4,270,761 A | * | 6/1981 | Hertz, Jr. ................... | 277/205 |
| 4,626,365 A | * | 12/1986 | Mori ........................... | 252/12 |
| 4,670,089 A | * | 6/1987 | Hanson | |
| 5,124,397 A | * | 6/1992 | Kanazawa et al. .......... | 524/496 |
| 5,401,574 A | * | 3/1995 | Masutani et al. | |
| 5,549,276 A | * | 8/1996 | Pittman et al. ............. | 251/214 |
| 5,551,706 A | * | 9/1996 | Barna et al. ................ | 277/229 |
| 5,577,777 A | * | 11/1996 | Singh et al. | |
| 5,755,261 A | * | 5/1998 | Fukuzawa et al. | |
| 5,788,216 A | * | 8/1998 | Pittman et al. | |
| 5,828,012 A | * | 10/1998 | Repolle et al. | |
| 5,882,012 A | * | 3/1999 | Niwa et al. .................. | 277/407 |
| 5,988,891 A | * | 11/1999 | Yamamoto et al. | |
| 6,103,815 A | * | 8/2000 | Mammino et al. | |

FOREIGN PATENT DOCUMENTS

GB  718142  11/1954

OTHER PUBLICATIONS

Derwent Publications Ltd., London, GB; AN 98–280467; XP002070285 & JP 10 095 889 A (MITSUBISHI), Apr. 14, 1998, Abstract.

Derwent Publications Ltd., London,, GB; AN 93–261896, XP002070286 & JP 05 179 231 A (NTN CORP), Jul. 20, 1993; Abstract.

* cited by examiner

*Primary Examiner*—Anthony Knight
*Assistant Examiner*—Vishal Patel
(74) *Attorney, Agent, or Firm*—Townsend and Townsend and Crew LLP

(57) ABSTRACT

A sealing element for a dry running piston compressor, in particular for a dry running oxygen compressor, contains perfluoroalkoxy-copolymer.

6 Claims, 5 Drawing Sheets

SEALING ELEMENTS FOR DRY RUNNING PISTON COMPRESSORS

Figure 1:
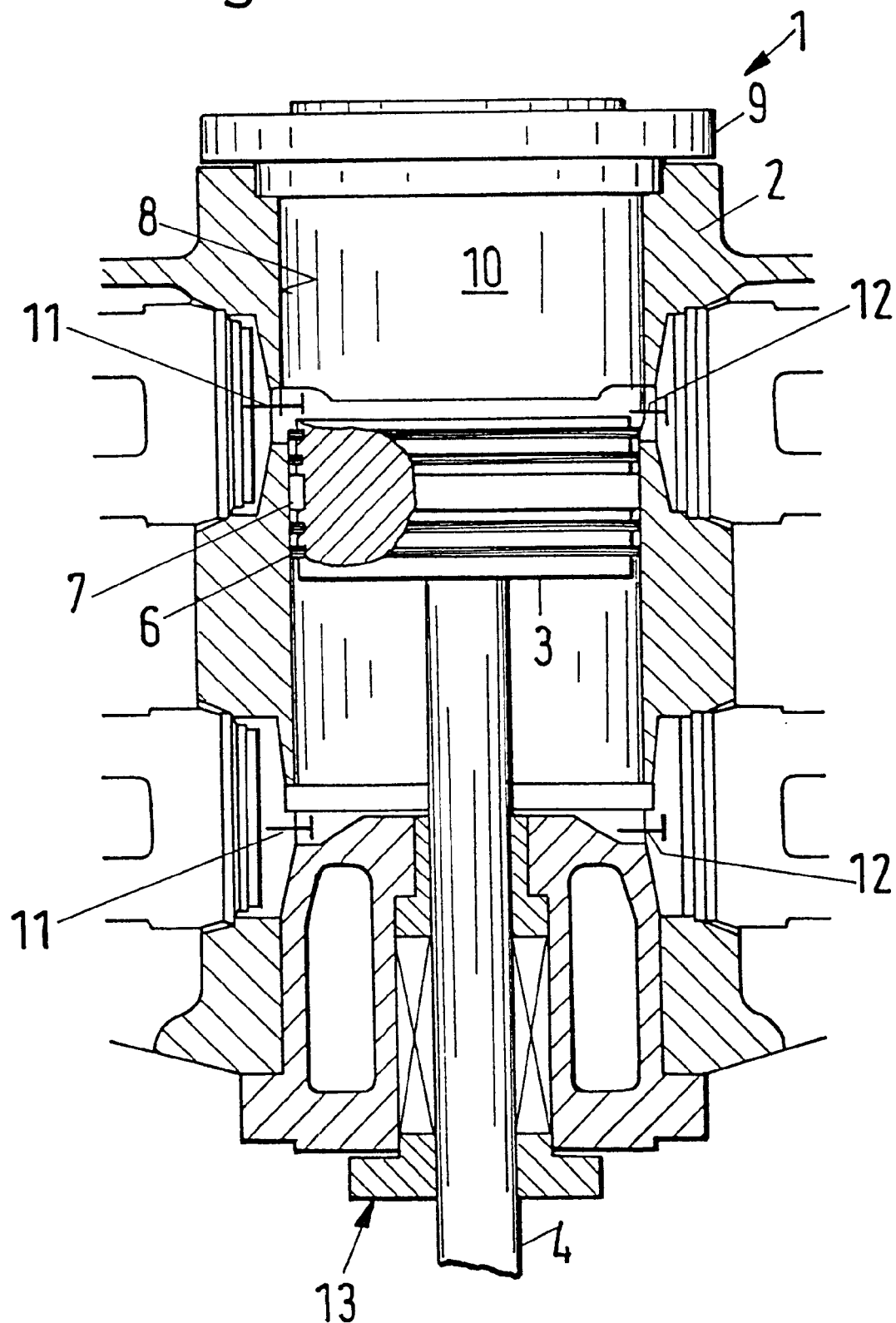

The invention relates to sealing elements for dry running piston compressors, in particular for dry running oxygen compressors.

Dry running piston compressors are compressors which operate without foreign lubricants, such as for example lubricating oil, in the compression part. The compression chamber must be sealed off from its surroundings as well as possible in this situation in order to prevent or at least to reduce to a minimum an undesirable or uncontrolled flowing out of the medium to be compressed. Critical points with respect to the sealing are, in particular, the region between the outer wall of the piston and the inner wall of the cylinder in which the piston moves during operation, the region of the passage of the piston rod into the cylinder space and the sealing components of the inlet and outlet valves (suction and compression valves) through which the medium to be compressed is brought into the compression chamber and the compressed medium is ejected from it respectively.

With the term "sealing element" all elements are meant which perform a sealing function with respect to the compression chamber, thus in particular guide rings and piston rings for sealing the piston, sealing or restrictor rings for sealing the piston rod and sealing valve components such as valve plates, valve rings or poppets.

In dry running piston compressors in particular sealing elements of this kind are subject to enormously high mechanical and thermal stresses. Since for example the sealing of a piston or of the piston rod is based on dry friction between the counter-running partners, the temperature in the compression chamber can rise sharply depending on the average piston speed and the pressure difference to be sealed off. In addition to good tribological properties, sealing elements of this kind must also retain their sealing properties at high temperatures and at high pressure differences. The sealing valve components must also function without problem in spite of strong alternating stresses and often high temperatures in order to achieve a good efficiency in dry running compressors.

For sealing off the piston and the piston rod in dry running piston compressors in particular, sealing elements are frequently made of plastic, for example of filled polymers or high-temperature polymers. For example polytetraflouorethylene (PTFE), poly(ether ether ketone) (PEEK), polyimide (PI) or polyamidimide (PAI) are used as a polymer material. These polymers are usually mixed with fillers such as carbon, graphite, glass fibres, metals, ceramic or solid lubricants and are designated in this form as filled polymers.

Especially in the compression of oxygen by means of dry running compressors, however, very special problems arise with respect to the materials for the sealing elements as a result of the high reactivity of the oxygen, above all when it is present in a compressed form and high temperatures are present in addition. Here there is the extremely great danger of the arising of compressor fires, which have significantly more devastating consequences in comparison with the compression of other gases. The presence of pure oxygen in compressed form leads to fires which can hardly be extinguished and which thus as a rule lead to the complete destruction of the compressor. In addition there is a considerable risk for the operating personnel.

For these reasons, for oxygen compressors, enormously strict requirements are placed on their operating safety. It has proved that most of the known polymers or high-temperature polymers respectively, which are admittedly used successfully in the compression of other gases, are not suitable for the manufacture of sealing elements for dry running oxygen compressors because they do not satisfy the strict safety requirements. Of the polymers usually used in dry running compressors as a sealing material only PTFE has proved to be "oxygen qualified" up till now. Other high-temperature polymers such as for example PEEK are not suitable and are therefore not used for oxygen compressors for safety reasons.

Sealing elements of PTFE or filled PTFE have other disadvantages, however. Thus PTFE has a pronounced tendency to creep (high cold flow) so that the pressure differences which can be achieved are strongly restricted hereby. High pressure differences lead to a flowing of the sealing elements, for example of the piston ring, through which the sealing action becomes so poor that unjustifiably high leakage rates arise. Therefore dry running oxygen compressors can only be operated nowadays at relatively low pressure differences in comparison with other gas compressors. This is however unsatisfactory in respect to an efficient and economical operation at a high efficiency.

The object of the invention is therefore to provide sealing elements for dry running piston compressors, in particular for dry running oxygen compressors, which also enable an efficient operation of the compressor at high pressure differences. The sealing elements should especially satisfy the high safety requirements for the dry running sealing of oxygen.

The sealing element satisfying this object is characterised by the features of the independent claim 1.

High pressure differences can also be efficiently sealed off with sealing elements which contain perfluoroalkoxy-copolymer (PFA). It is unexpected and surprising in particular that it has proved that such sealing elements in accordance with the invention also satisfy the high safety requirements which are placed on sealing elements for dry running oxygen compressors. The mechanical, thermal, tribological and chemical properties of the sealing element in accordance with the invention enable a significant increase in performance, in particular high pressure differences, in dry running oxygen compressors in comparison with those oxygen compressors which contain known sealing elements, without concessions to the operating safety being required.

The sealing elements in accordance with the invention have the additional advantage that they can be manufactured by means of injection moulding processes.

The sealing elements in accordance with the invention preferably further contain fillers such as carbon powder, graphite, bronze, copper, molybdenum disulphide and/or fibrous materials such as carbon fibres, aramide fibres, glass fibres and/or glass balls. Through such fillers e.g. the tribological properties can improved, the heat resistance can be increased and the cold flow can be practically reduced to zero.

The sealing element in accordance with the invention is preferably designed as a piston ring or a guide ring for the piston, as a sealing or restrictor ring for sealing off the piston rod or as a sealing valve component, in particular as a valve body, of a valve of the piston compressor.

Figure 2:
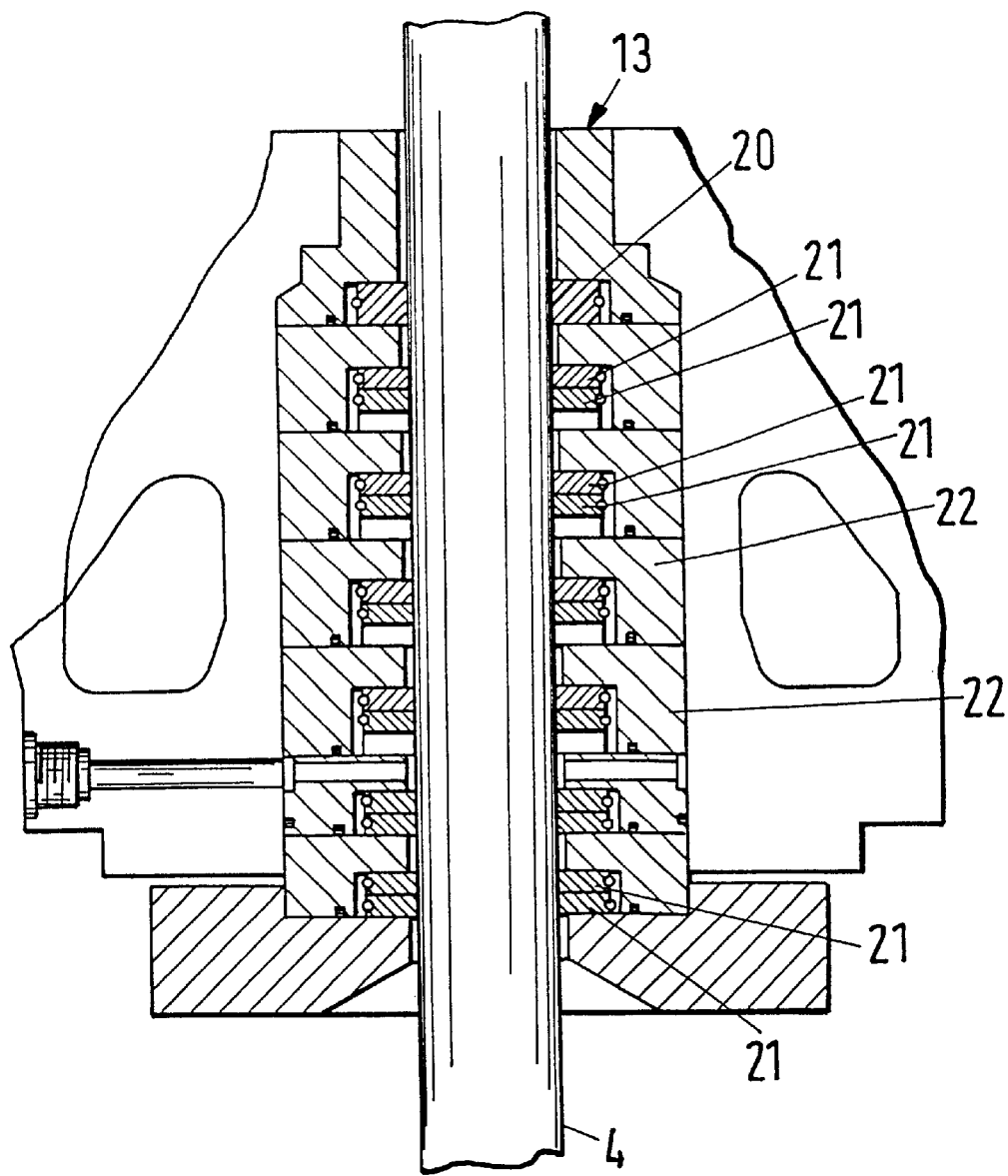
Figure 3:
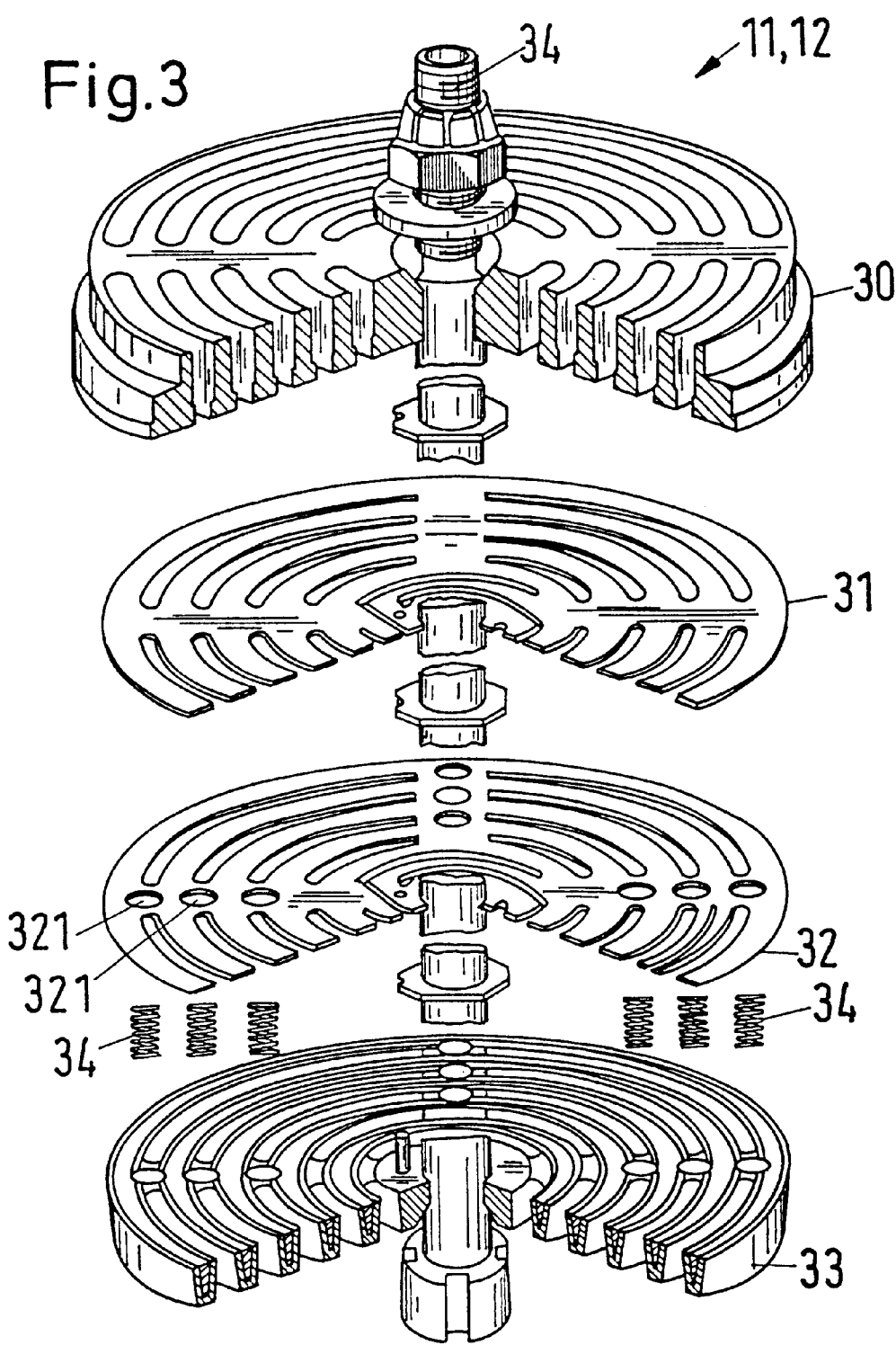
Figure 4:
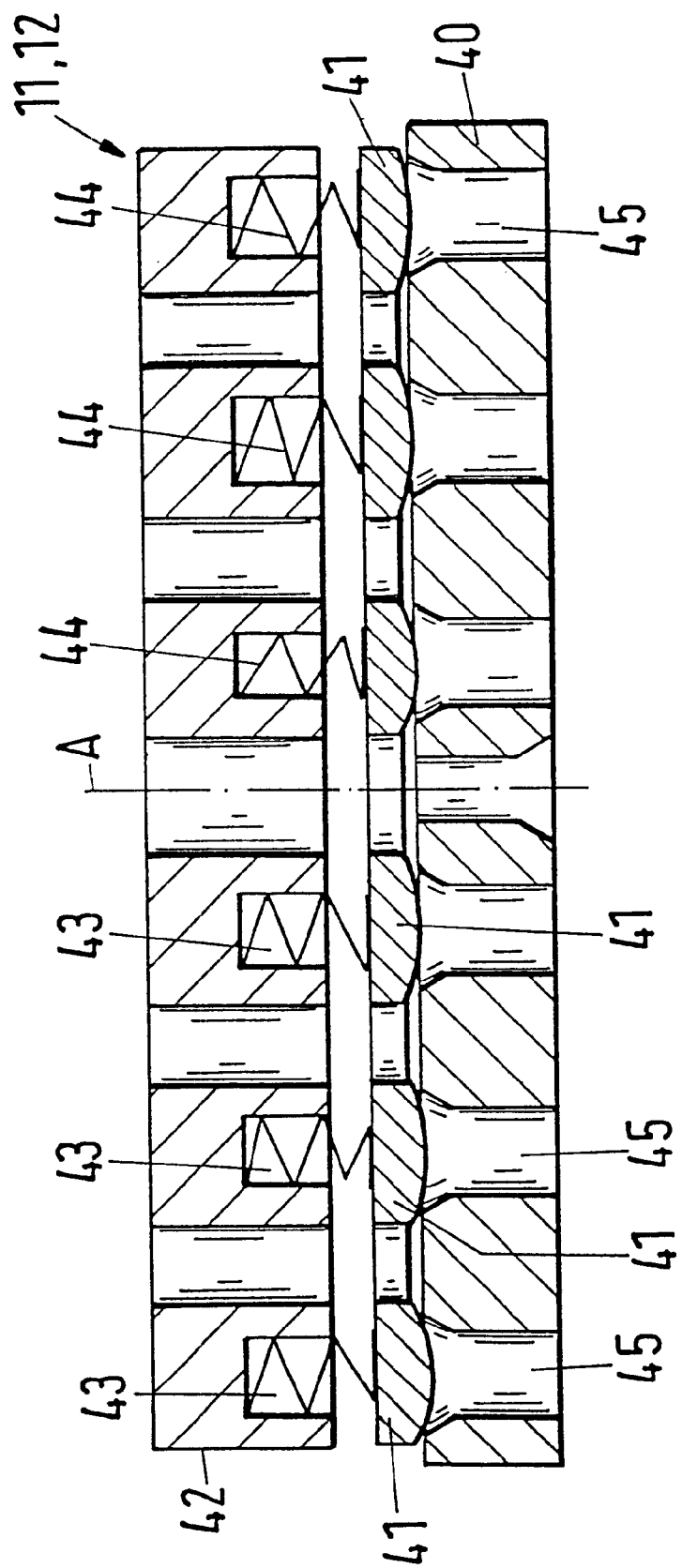
Figure 5:
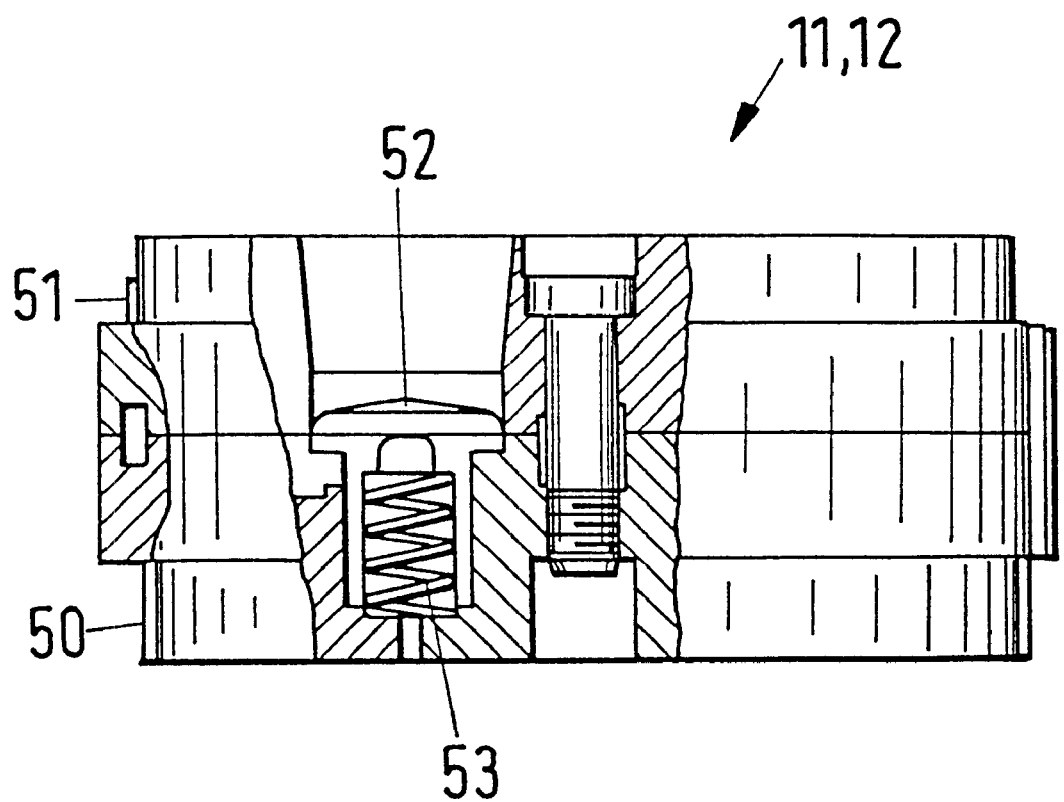

In the following the invention will be described in more detail with reference to exemplary embodiments and with reference to the drawings. Shown in the schematic drawings, which are not to scale, are:

FIG. 1 the essential parts of a dry running piston compressor (piston partially broken away), FIG. 2 the piston rod seal of a dry running piston compressor, FIG. 3 an exploded view of a plate valve with sealing elements in accordance with the invention, FIG. 4 a schematic sectional illustration of a ring valve, and FIG. 5 an illustration of a poppet valve (partially broken away).

The sealing elements for dry running piston compressors are characterised in that they contain perfluoroalkoxy-copolymer (PFA). In this the term "sealing elements" is used to mean those elements which contribute to the sealing off of the compression chamber, thus for example piston rings, guide rings, sealing rings or restrictor rings for the sealing off of the piston rod as well as sealing valve components of the suction and compression valves.

For a better understanding, FIG. 1 shows the essential parts of a dry running piston compressor, in particular of a dry running oxygen compressor, which is designated in its entirety with the reference numeral 1. The piston compressor 1 has a cylinder 2, of which the inner space is closed off in the axial direction by a cylinder cap 9. A piston 3 is arranged to be movable back and forth in the interior of the cylinder. The end of the piston 3 which is illustrated at the bottom merges into a piston rod 4 which is driven by non-illustrated drive means, for example via a cross-head. A compression chamber 10 is located between the end of the piston 3 which is illustrated at the top and the cylinder cap 9. In a manner which is known per se, the oxygen to be compressed is sucked in through an inlet or suction valve 11 into the compression chamber 10 during a downward movement (with respect to the illustration in FIG. 1) and ejected via an outlet or compression valve 12 from the compression chamber 10 during the following upward movement. The suction valve 11 and the pressure valve 12 can, as shown in FIG. 1, be executed as separate valves, that is, valves which are physically separate from one another, or else in the form of a construction unit as a suction/compression valve.

In the event that the piston compressor 1 is executed as a doubly acting compressor, a further compression chamber is located in the interior of the piston 2 in accordance with the illustration of FIG. 1 beneath the piston, for which then additional suction and compression valves 11, 12 are also provided.

The passage of the piston rod 4 into the interior of the cylinder is sealed off with a piston rod seal 13, a so-called packing, which will be explained in more detail later.

Piston rings 6 and where appropriate at least one guide ring 7 are provided at the piston 3 which rub along the inner wall 8 of the cylinder 2 during operation and seal off the high pressure side of the compression chamber 10 along the piston 3 against the low pressure side and ensure the guidance of the piston 3. This kind of a seal is based on dry friction between the counter-running partners. The piston rings 6 can naturally also be arranged between the chamber rings at the piston 3 as so-called captive piston rings.

FIG. 2 shows a detailed illustration of the piston rod seal 13, which is executed as a packing. The piston rod seal 13 comprises at least one restrictor ring 20 and a plurality of sealing rings 21 which are arranged between chamber rings 22. In the embodiment illustrated in FIG. 2 the sealing rings 21 are in each case arranged pair-wise between the chamber rings 22, that is, there are in each case two sealing rings 21 lying in contact with one another between two adjacent chamber rings 22.

The guide ring 7, the piston rings 6, the restrictor ring 20, the sealing rings 21 and valve components of the suction and compression valves 11, 12 explained in more detail further back are in each case embodiments of the sealing element in accordance with the invention. These sealing elements 6, 7, 11, 12 contain PFA. It is particularly preferred for the PFA to be mixed with fillers such as carbon powder, graphite, bronze, copper, molybdenum disulphide and/or fibrous materials such as carbon fibres, aramide fibres, glass fibres and/or glass balls. The filler amounts in this to e.g. about 30%–35%. It has unexpectedly proved that sealing elements 6, 7, 20, 21 of filled PFA of this kind satisfy the strict safety requirements that are placed on sealing elements for dry running oxygen compressors. As a result of the high resistance to chemicals, the absence of cold flow, the high strength, in particular heat resistance, and the good tribological properties of filled PFA, dry running piston compressors for the compression of oxygen can be manufactured with the sealing elements 6, 7, 20, 21 in accordance with the invention which can be operated at substantially higher pressure differences, for example up to 250 bar, than is possible with known sealing elements in dry running. It is particularly advantageous in this that this considerable increase in performance and efficiency can be achieved without concessions with respect to the operating safety in the compression of oxygen being necessary.

A further advantage of the sealing elements 6, 7, 20, 21 in accordance with the invention, in particular from the point of view of manufacturing technology, is to be seen in that they can also be manufactured in an injection moulding process. Naturally the manufacture is also alternatively possible by means of conventional mechanical machining out of semi-finished products.

In FIGS. 3, 4, 5 several preferred types of the execution of suction and compression valves 11, 12 are illustrated which contain valve components or valve bodies which represent embodiments of the sealing element in accordance with the invention. In this it is possible in a manner which is known per se, in particular in the embodiments illustrated in FIGS. 3 and 4, that a single valve performs both the function of the suction valve 11 and the compression valve 12, which means that the suction valve 11 and the compression valve 12 form a construction unit. In FIGS. 3, 4 and 5 the valves are in each case designated in their entirety with the reference symbol 11, 12 in order to indicate that they can serve both as a suction valve 11 and as a compression valve 12.

FIG. 3 shows an exploded view of a plate valve 11, 12, with a valve seat 30, a valve plate 31, a damper plate 32 and a catcher 33. These parts are held together by a central screw 34. The damper plate 32 has openings 321 for the passage of springs 34 which are arranged to act between the catcher 33 and the valve plate 31. The valve plate 31 and the damper plate 32, which are subject to the highest alternating stresses during operation, are embodiments of the sealing element in accordance with the invention.

FIG. 4 shows a sectional illustration of a ring valve 11, 12 with a valve seat 40 which has passage openings 45, with a plurality of rings 41 which are arranged concentric to the axis A of the ring valve 11, 12 and which illustrate the sealing valve components here, and with a catcher 42. Cut-outs 43 are arranged in the catcher 42 in which springs 44 are arranged which press the rings 41 against the passage openings 45. The rings 41 are embodiments of the sealing element in accordance with the invention.

Likewise preferred, the sealing elements in accordance with the invention can also be designed as sealing bodies of passage valves. Passage valves are very similar to ring valves, but in passage valves the passage openings in the valve seat are not designed as concentric ring shaped or ring-segment shaped openings, but as straight passages.

Accordingly, no rings are provided in the passage valve as sealing valve components, but rather a plurality of strip-like sealing bodies which are sealingly pressed against the passages which serve as passage openings with a bias force by spring elements, for example leaf springs.

FIG. 5 shows, partly broken away, a so-called poppet valve with a housing which comprises a first housing part 50 and a second housing part 51 as well as with a substantially mushroom-shaped valve body 52, the so-called poppet, which is arranged in a correspondingly executed bore which extends through both housing parts 50, 51. A spring 53 acts between the first housing part 50 and the valve body 52. A plurality of valve bodies 52 can also be arranged in a housing. The valve bodies 41 are embodiments of the sealing element in accordance with the invention.

If the sealing element in accordance with the invention is designed as a piston ring 6 (FIG. 1), a guide ring 7, a restrictor ring 20 (FIG. 2) or a sealing ring 21, then both single-piece and multi-piece embodiments (segmented rings) are suitable for it.

What is claimed is:

1. In the combination:
    a dry running positive displacement compressor including a chamber for containing oxygen for compression and a piston moveable within the chamber for compressing oxygen within the chamber;
    an inlet for supplying oxygen to the chamber for compression;
    a seal for sealing off the chamber to ensure compression, the improvement to the seal comprising:
  the seal includes at least 65% by weight perfluoroalkoxy-copolymer and forms a seal of the chamber without fusion to the piston and the chamber.

2. The combination of claim 1 and further including:
    a filler constituting less than 35% by weight of the seal having a compound chosen from the group consisting of carbon powder, graphite, bronze, copper, molybdenum disulphide, carbon fibers, glass fibers, and glass balls.

3. The combination of claim 1 and further including:
  the seal is piston ring.

4. The combination of claim 1 and further including:
  the seal is a guide ring.

5. The combination of claim 1 and further including:
  the seal seals off the piston rod of the compressor.

6. The combination of claim 1 and further including:
  the seal is a seal valve component of the piston compressor.

* * * * *